(12) United States Patent
Hunn et al.

(10) Patent No.: US 8,121,548 B2
(45) Date of Patent: Feb. 21, 2012

(54) COMMUNICATION SYSTEM

(75) Inventors: Nicholas Hunn, Middlesex (GB); Timothy John Wheatley, Crowthorne (GB); Mahendra Tailor, Middlesex (GB)

(73) Assignee: Ezurio Limited, Woodburn Green (GB)

( * ) Notice: Subject to any disclaimer, the term of this patent is extended or adjusted under 35 U.S.C. 154(b) by 518 days.

(21) Appl. No.: 12/282,929

(22) PCT Filed: Mar. 16, 2007

(86) PCT No.: PCT/GB2007/000956
§ 371 (c)(1),
(2), (4) Date: Jan. 9, 2009

(87) PCT Pub. No.: WO2007/105008
PCT Pub. Date: Sep. 20, 2007

(65) Prior Publication Data
US 2010/0035548 A1    Feb. 11, 2010

(30) Foreign Application Priority Data

Mar. 16, 2006 (GB) .................................. 0605310.2

(51) Int. Cl.
*H04B 1/00* (2006.01)
(52) U.S. Cl. ........................ 455/41.3; 455/41.2; 455/416
(58) Field of Classification Search ................. 455/41.2, 455/41.3, 416; 370/260, 266, 268, 269
See application file for complete search history.

(56) References Cited

U.S. PATENT DOCUMENTS

| | | |
|---|---|---|
| 2003/0176178 A1 | 9/2003 | Urata et al. |
| 2003/0200434 A1 | 10/2003 | Arnoux |
| 2003/0224808 A1 | 12/2003 | Bonta |
| 2004/0192202 A1* | 9/2004 | Novorita et al. ................ 455/24 |

FOREIGN PATENT DOCUMENTS

| | | |
|---|---|---|
| GB | 2382952 A | 11/2003 |
| GB | 2436188 | 9/2007 |
| WO | WO 01/43351 | 6/2001 |
| WO | WO 02/087205 | 10/2002 |
| WO | WO 2007/105008 | 9/2007 |

OTHER PUBLICATIONS

Specification of the Bluetooth System Core, Version 1.1, Feb. 22, 2001, pp. 1011-1017.*

* cited by examiner

*Primary Examiner* — Lewis West
(74) *Attorney, Agent, or Firm* — Harness, Dickey & Pierce, P.L.C.

(57) ABSTRACT

A radio communication system includes a plurality of Bluetooth radio devices. Each device has a microphone, an audio output, such as a loudspeaker, and a short range radio transceiver capable of communicating digital data with a plurality of compatible neighboring radio devices. Each radio device is configured to receive outgoing audio data from a first neighboring radio device, to mix an input audio signal received at the microphone with the received outgoing audio data, and to transmit the combined audio data to a second neighboring radio device. Each radio device is further configured to receive incoming audio data from the second radio device, to output an output audio signal corresponding to the received incoming audio data to the audio output, and to re-transmit the received incoming audio data to the first radio device. The radio devices form a communication chain, and each radio device is in communication with a maximum of one first radio device and one second radio device. A start radio device which has no first neighboring radio device is configured to transmit to the second radio device audio data corresponding to only the input audio signal. An end radio device which has no second neighboring radio device is configured to re-transmit the combined audio data to the first radio device. The system provides an audio network that can include a large number of participant devices.

20 Claims, 2 Drawing Sheets

COMMUNICATION SYSTEM

CROSS REFERENCE TO RELATED APPLICATION

This application is a 371 of PCT International Application No. PCT/GB2007/000956 filed Mar. 16, 2007 (Publication No. WO2007/105008), which claims priority to Great Britain Application No. 0605310.2 filed Mar. 16, 2006 (now Great Britain Patent No. 2436188 issued Sep. 19, 2007). The disclosures of the above applications are incorporated herein by reference in their entirety.

FIELD OF THE INVENTION

This invention relates to an audio communication system using a short wave radio protocol, such as the Bluetooth® communications protocol and to radio devices for use in such a system.

BACKGROUND TO THE INVENTION

According to the Bluetooth specification, a standard Bluetooth device can operate as a master device for up to seven slave Bluetooth devices which are controlled by the master device to form a so-called "piconet". Within the piconet, the master and slave devices can exchange data as if the devices were operating on a wired network. However, a standard Bluetooth device has only three (full duplex) audio channels. Thus, if the piconet is to be used to network audio data, such as voice communication, a maximum of only three slaves devices are capable of participating in the piconet. Thus, an audio network based on a Bluetooth piconet is limited to a maximum of four participants.

It would be desirable to provide a method of audio communication between Bluetooth devices that is not restricted to only four participants.

SUMMARY OF THE INVENTION

This invention provides a short range radio device, in particular a Bluetooth radio device, comprising a microphone input, an audio output and a short range radio transceiver capable of communicating digital data with a plurality of compatible neighbouring radio devices. The radio device is configured to receive outgoing audio data from a first neighbouring radio device, to mix an input audio signal received at the microphone input with the received outgoing audio data and to transmit the combined audio data to a second neighbouring radio device. The radio device is further configured to receive incoming audio data from the second radio device, to output an output audio signal corresponding to the received incoming audio data to the audio output and to re-transmit the received incoming audio data to the first radio device.

The radio device according to the invention can be used to build a communication network in which each radio device can contribute audio to the network via the microphone input and hear the contributions of all other participants via the audio output. Each device receives the audio from a first neighbouring device, contributes its own audio from the microphone, if desired, and passes the combined audio to a second neighbouring device. In this way, a communication chain of radio devices can be built-up.

In a complete network, one (end) device is configured to re-transmit the combined audio data back to its first neighbouring radio device. This end device closes the communication loop of the network and forms the end of the communication chain. The remaining devices in the chain re-transmit the combined audio data, which will represent the combination of all of the input audio signals from all of the devices in the chain, back along the chain so that each radio device can hear what every participant has contributed.

In this way, the invention provides a highly scalable audio communications network based on short range radio communication. Indeed, a network according to the invention can facilitate, via the communication chain, audio communication between two radio devices that are outside the range of direct radio communication.

Viewed from a further aspect therefore the invention provides a radio communication system comprising a plurality of radio devices as described above, wherein the radio devices form a communication chain and each radio device is in communication with a maximum of one first radio device and one second radio device.

The invention also extends to a method of radio communication using the described radio devices and to computer software which configures a general-purpose radio device to operate as a radio device described above.

Typically, the input audio signal is an analogue audio signal. In this case, the radio device may comprise an analogue to digital converter, such as a codec, for converting the input audio signal to digital data. Similarly, typically, the output audio signal is an analogue audio signal. The radio device may comprise a digital to analogue converter, such as a codec, for converting received audio data to the output audio signal.

The radio device may comprise a mixer for mixing the input audio signal received at the microphone input with the received outgoing audio data. The mixer may be an analogue mixer. Alternatively, however, the mixer may be a digital mixer.

In the audio network, a start device, which has no first neighbouring radio device may be configured to transmit to the second radio device audio data corresponding to only the input audio signal. Such a start device represents the start of the communication chain.

BRIEF DESCRIPTION OF THE DRAWINGS

An embodiment of the invention will now be described, by way of example only, and with reference to the accompanying drawings, in which.

DETAILED DESCRIPTION OF AN EMBODIMENT

Figure 1:
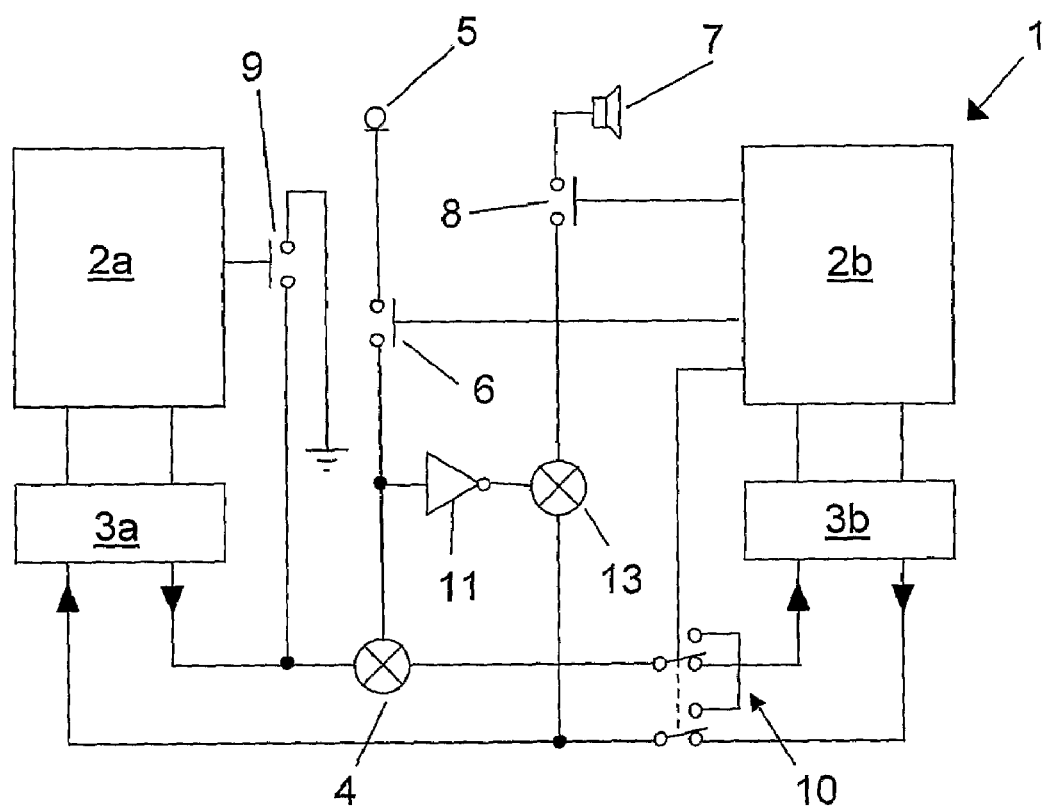
FIG. 1 is a schematic representation of a radio device according to an embodiment of the invention.

FIG. 1 shows schematically a radio device 1 according to an embodiment of the invention. The device 1 comprises two Bluetooth communications modules 2a, 2b, each of which is capable of radio data communication with a compatible remote Bluetooth device. Although the modules 2a, 2b have been represented in FIG. 1 as separate units, the modules may be provided by separate channels of a single module, such as the blu2i Module, manufactured by Ezurio Limited, of London, United Kingdom.

The modules 2a, 2b are each connected to respective audio codecs (coder-decoders) 3a, 3b, which encode an input analogue audio signal into corresponding digital data and pass the encoded digital data to the respective module 2a, 2b. Likewise, the codecs 3a, 3b decode digital audio data received from the respective module 2a, 2b into a corresponding output analogue audio signal. The input and output analogue audio signals from the codecs 3a, 3b are represented with arrowheads on the connections to the codecs 3a, 3b in FIG. 1.

The analogue audio output from the first codec 3a is routed to a mixer 4, which mixes the analogue audio with an audio signal from a microphone 5. A microphone switch 6 is provided in the line between the microphone 5 and the mixer 4 and is controlled by the second module 2b to connect or disconnect the microphone 5 to the mixer 4. This allows the second module 2b to mute input from the microphone 5, as necessary. The analogue audio signal from the mixer 4, which is a mix of any audio output from the first module 2a and any audio input from the microphone 5, is routed to the input of the second codec 3b, where it is converted to digital audio data and passed to the second module 2b.

The analogue audio output from the second codec 3b is routed to the input of the first codec 3a, where it is converted to digital audio data and passed to the first module 2a. The line between the output of the second codec 3b and the input of the first codec 3a is tapped by a connection to a loudspeaker 7 (or other analogue audio output device, such as headphones, an earpiece or line out). A loudspeaker switch 8 is provided in the line to the loudspeaker 7 and is controlled by the second module 2b to connect or disconnect the loudspeaker 7 to the analogue audio output from the second codec 3b. This allows the second module 2b to mute output from the loudspeaker 7, as necessary.

The line between the first codec 3a and the mixer 4 is tapped with a connection to earth. An earth switch 9 is provided in the line to earth and is controlled by the first module 2a to connect or disconnect the input of the mixer 4 to earth. This allows the first module 2a to force the mixer 4 to receive only input from the microphone 5.

The line between the mixer 4 and the second codec 3b includes a loop switch arrangement 10 which allows the connections to and from the second codec 3b to be broken and a direct connection to be made between the output of the mixer and the loudspeaker connection/input to the first codec 3a. The loop switch arrangement 10 is controlled by the second module 2b to connect or disconnect the analogue output of the mixer 4 to the input of the first codec 3a (and the loudspeaker 7), for reasons that will be explained below.

A variable inverting delay 11 is provided between the input to the mixer 4 from the microphone 5 and the line to the loudspeaker 7 from the analogue audio output of the second codec 3b. The output of the delay 11 is mixed into the input to the loudspeaker 7 by a delay mixer 13. The delay 11 provides echo cancellation at the loudspeaker 7, because for reasons that will be explained below, the audio input from the microphone 5 is reproduced at the analogue audio output of the second codec 3b with a time delay. It is possible for the delay 11 to set the delay period actively by identifying the delayed audio signal from the microphone 5 in the signal destined for the loudspeaker 7.

As an alternative to the variable inverting delay 11 and delay mixer 13 for echo cancellation, the microphone switch 6 and the loudspeaker switch 8 may be arranged to operate in opposition, such that the microphone 5 is muted when the speaker 7 operates and vice versa. In this way, the output of the microphone 5 is not heard at the speaker 7.

In general, each module 2a, 2b is configured to communicate with a respective neighbouring device 1 of the type described above by means of a Bluetooth radio link. Audio data received from the neighbouring device is output as an analogue audio signal from the output of the codec 3a, 3b associated with the receiving module 2a, 2b. Similarly, an analogue audio signal at the input of the codec 3a, 3b associated with the receiving module 2a, 2b is transmitted to the neighbouring device as audio data.

Figure 2:
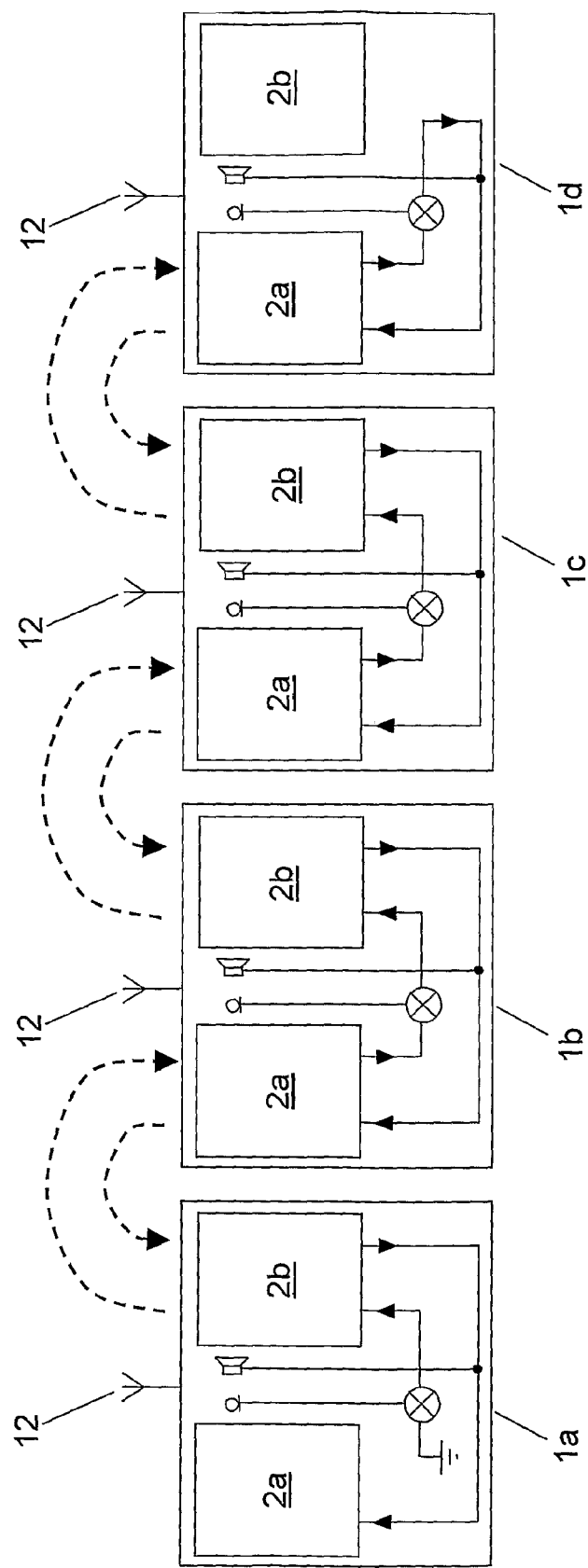
FIG. 2 is a simplified representation of a radio communication network formed by four of the devices of FIG. 1.

FIG. 2 shows four radio devices 1a, 1b, 1c, 1d of the type described in relation to FIG. 1 arranged for mutual communication in an audio network. In FIG. 2, the devices 1a, 1b, 1c, 1d are represented in a simplified form compared to FIG. 1, according to which the switches, 6, 8, 9, 10 and the delay 11 are not shown and the codes 3a, 3b are not shown separately. The antenna 12 of each device is shown in FIG. 2.

The audio network forms a communication loop on which the user of each device 1a, 1b, 1c, 1d can speak using the respective microphone 5 and hear all other participants on the respective loudspeaker 7. The communication loop starts with the first device 1a. For correct operation of the network, the earth switch 9 of the first device 1a is closed to connect one input of the mixer 4 to earth, so that the mixer 4 receives only input from the microphone 5 of the first device 1a. Audio from the microphone 5 of the first device 1a is passed to the second module 2b of the first device 1a, via the second code 3b, and is transmitted wirelessly over the air interface to the second device 1b, as represented by the dashed arrows in FIG. 2.

In the second device 1b, the audio data from the first device 1a is received by the first module 2a, decoded by the first codec 3a and passed to the mixer 4, where it is mixed with the audio signal from the microphone 5 of the second device 1b. The mixed signal is passed to the second module 2b of the second device 1b, via the second codec 3b, and is transmitted wirelessly over the air interface to the third device 1c.

Similarly, in the third device 1c, the audio data from the second device 1b is received by the first module 2a, decoded by the first codec 3a and passed to the mixer 4, where it is mixed with the audio signal from the microphone 5 of the third device 1c. The mixed signal is passed to the second module 2b of the third device 1c, via the second codec 3b, and is transmitted wirelessly over the air interface to the fourth device 1d.

In this example, the fourth device 1d is the end of the chain of radio devices and forms the return point of the communication loop. Thus, in the fourth device 1d, the loop switch arrangement 10 connects the analogue output of the mixer 4 to the input of the first codec 3a and the loudspeaker 7. In the fourth device 1d, the audio data from the third device 1c is received by the first module 2a, decoded by the first codec 3a and passed to the mixer 4, where it is mixed with the audio signal from the microphone 5 of the fourth device 1d. The mixed signal is passed to the input of the first codec 3a and the loudspeaker 7. The audio passed to the input of the first codec 3a of the fourth device 1d is therefore a mix of the audio signals from each of the microphones 5 of the first, second, third and fourth devices 1a, 1b, 1c, 1d. The audio passed to the loudspeaker 7 of the fourth device 1d is a mix of the audio signals from each of the microphones 5 of the first, second and third devices 1a, 1b, 1c, because the delay 11 of the fourth device 1d cancels the audio signal from the microphone 5 of the fourth device 1d. In this case, the delay 11 will be operating simply as an inverter with zero time delay.

The mix of the audio signals from each of the microphones 5 of the first, second, third and fourth devices 1a, 1b, 1c, 1d at the input of the first codec 3a of the fourth device 1d is encoded as digital data by the first codec 3a and transmitted wirelessly over the air interface by the first module 2a of the fourth device 1d to the third device 1c, as represented by the dashed arrows in FIG. 2.

In the third device 1c, the audio data from the fourth device 1d is received by the second module 2b, decoded by the second codec 3a and passed to the input of the first codec 3a and the loudspeaker 7. The audio passed to the input of the first codec 3a of the third device 1c is a mix of the audio signals from each of the microphones 5 of the first, second, third and fourth devices 1a, 1b, 1c, 1d. The audio passed to the loudspeaker 7 of the third device 1c is a mix of the audio signals from each of the microphones 5 of the first, second and fourth devices 1a, 1b, 1d, because the delay 11 of the third device 1c cancels the audio signal from the microphone 5 of the third device 1c. In this case, the delay 11 will be operating as an inverter with a time delay corresponding to the number of Bluetooth cycles required to transmit the audio data from the third to the fourth device and back again.

The mix of the audio signals from each of the microphones 5 of the first, second, third and fourth devices 1a, 1b, 1c, 1d at the input of the first codec 3a of the third device 1c is encoded as digital data by the first codec 3a and transmitted wirelessly over the air interface by the first module 2a of the third device 1c to the second device 1b.

In the second device 1b, the audio data from the third device 1c is received by the second module 2b, decoded by the second codec 3a and passed to the input of the first codec 3a and the loudspeaker 7. The audio passed to the input of the first codec 3a of the second device 1b is a mix of the audio signals from each of the microphones 5 of the first, second, third and fourth devices 1a, 1b, 1c, 1d. The audio passed to the loudspeaker 7 of the second device 1b is a mix of the audio signals from each of the microphones 5 of the first, third and fourth devices 1a, 1c, 1d, because the delay 11 of the second device 1b cancels the audio signal from the microphone 5 of the second device 1b. In this case, the delay 11 will be operating as an inverter with a time delay corresponding to the number of Bluetooth cycles required to transmit the audio data from the second to the third device, from the third to the fourth device and back again to the second device.

The mix of the audio signals from each of the microphones 5 of the first, second, third and fourth devices 1a, 1b, 1c, 1d at the input of the first codec 3a of the second device 1b is encoded as digital data by the first codec 3a and transmitted wirelessly over the air interface by the first module 2a of the second device 1b to the first device 1a.

In the first device 1a, the audio data from the second device 1b is received by the second module 2b, decoded by the second codec 3a and passed to the input of the first codec 3a and the loudspeaker 7. In an adaptation, the audio signal from the second codec 3a may be routed only to the loudspeaker 7, by the provision of suitable switches. The audio passed to the loudspeaker 7 of the first device 1b is a mix of the audio signals from each of the microphones 5 of the second, third and fourth devices 1b, 1c, 1d, because the delay 11 of the first device 1a cancels the audio signal from the microphone 5 of the first device 1a. In this case, the delay 11 will be operating as an inverter with a time delay corresponding to the number of Bluetooth cycles required to transmit the audio data all the way along the loop.

It will be appreciated from the above that the audio network forms a communication loop on which the user of each device 1a, 1b, 1c, 1d can speak using the respective microphone 5 and hear all other participants on the respective loudspeaker 7. Some delays are introduced into the communication, because of the sequential transmission of audio data between neighbouring devices. However, the speed of Bluetooth communication is sufficiently high that any delays are only perceptible to the user when the network includes a very large number of devices.

It will be appreciated further that in the arrangement described in FIG. 2, the first device 1a can be considered to be a start device and the fourth device 1d can be considered to be an end device, with the second and third device 1b, 1c considered as intermediate devices. Accordingly, any number of intermediate devices can be provided in sequence between a start device and an end device, such that the number of devices in the network can be increased without limitation.

Furthermore, because the construction of each radio device in the network is identical, any device can operate as a start device, an end device or an intermediate device. Consequently, the network can be arranged by configuring the switches 9, 10 of each device to operate in the most effective arrangement. In particular, because the devices can exchange non-audio data on other Bluetooth channels, the network can be configured dynamically in use to accommodate relocation of the individual devices.

Although the radio devices of the invention have been described with an analogue mixer, this is not essential and digital mixing of the audio signal from the microphone may be used.

Although the particular embodiment of the invention has been described in terms of a combination of switches and components, this is not essential and any arrangement that achieves the effects of the invention may be contemplated. For example, a device according to the invention may be configured to function using software on a standard device. Alternatively, the device may be configured in hardware or a combination of software and hardware, as described.

In summary, a radio communication system comprises a plurality of Bluetooth radio devices 1a, 1b, 1c, 1d. Each device has a microphone 5, an audio output, such as a loudspeaker 7, and a short range radio transceiver 2a, 2b capable of communicating digital data with a plurality of compatible neighbouring radio devices. Each radio device is configured to receive outgoing audio data from a first neighbouring radio device, to mix an input audio signal received at the microphone 5 with the received outgoing audio data and to transmit the combined audio data to a second neighbouring radio device. Each radio device is further configured to receive incoming audio data from the second radio device, to output an output audio signal corresponding to the received incoming audio data to the audio output and to re-transmit the received incoming audio data to the first radio device. The radio devices form a communication chain and each radio device is in communication with a maximum of one first radio device and one second radio device. A start radio device 1a which has no first neighbouring radio device is configured to transmit to the second radio device audio data corresponding to only the input audio signal. An end radio device 1d which has no second neighbouring radio device is configured to re-transmit the combined audio data to the first radio device. The system provides an audio network that can include a large number of participant devices.

The invention claimed is:

1. A short range radio device comprising:
a microphone input;
an audio output;
a short range radio transceiver capable of communicating digital data with a plurality of compatible neighbouring radio devices; and
a delay coupled between the microphone input and the audio output,
wherein the short range radio device is configured to receive outgoing audio data from a first neighbouring radio device, to mix an input audio signal received at the microphone input with the received outgoing audio data to obtain combined audio data and to transmit the combined audio data to a second neighbouring radio device, wherein the short range radio device is further configured to receive incoming audio data from the second neighbouring radio device representing a mix of at least the combined audio data and an input audio signal received at a microphone input of the second neighbouring radio device, to provide an output audio signal corresponding to the received incoming audio data, and to re-transmit the received incoming audio data to the first radio device, and wherein the delay is configured to cancel the input audio signal from the microphone input of the short range radio device in the output audio signal outputted at the audio output.

2. A radio device as claimed in claim 1, wherein the input audio signal is an analogue audio signal and the output audio signal is an analogue audio signal.

3. A radio device as claimed in claim 1, wherein the device is configured to transmit to the second radio device audio data corresponding to only the input audio signal, in the absence of a first neighbouring radio device.

4. A radio device as claimed in claim 1, wherein the device is configured to re-transmit the combined audio data to the first radio device, in the absence of a second neighbouring radio device.

5. A radio communication system comprising a plurality of radio devices as claimed in claim 1, wherein the radio devices form a communication chain and each radio device is in communication with a maximum of one first radio device and one second radio device.

6. A radio device as claimed in claim 1, wherein the input audio signal is an analogue audio signal.

7. A radio device as claimed in claim 6, wherein the radio device includes an analogue to digital converter for converting the input analogue audio signal to digital data.

8. A radio device as claimed in claim 1, wherein the output audio signal is an analogue audio signal.

9. A radio device as claimed in claim 6, wherein the radio device includes an digital to analogue converter for converting received audio data to the output analogue audio signal.

10. The radio device as claimed in claim 1, wherein the radio device is a Bluetooth radio device.

11. The radio device as claimed in claim 1, wherein the radio device includes at least one of an analogue or digital mixer for mixing an input audio signal received at the microphone input with the received outgoing audio data.

12. The radio device as claimed in claim 1, wherein the delay is a variable inverting delay operable for setting a delay period corresponding to a delayed audio signal from the microphone input in the output audio signal destined for the audio output, whereby the delay provides echo cancellation at the audio output.

13. The system as claimed in claim 5, wherein:
the system is configured such that the plurality of radio devices form a communication loop on which a user of one of the radio devices can speak via the microphone input and hear users of the other radio devices via the audio output, and which includes:
a start radio device which has no first neighbouring radio device, the start radio device forms a beginning of the communication chain and starts the communication loop, the start radio device configured to transmit to its second neighbouring radio device audio data corresponding to only the input audio signal;
an end radio device which has no second neighbouring radio device, the end radio device forms an end of the communication chain and forms a return point that closes the communication loop, the end radio device configured to re-transmit the combined audio data to its first neighbouring radio device; and
at least one intermediate radio device within the communication chain between the start radio device and the end radio device;
the construction of the radio devices is identical such that any radio device can operate as the start radio device, end radio device, or intermediate radio device, thereby allowing the system to be configured selectively and/or configured dynamically to accommodate relocation of the individual radio devices.

14. A radio device comprising:
a microphone input;
an audio output;
a short range radio transceiver capable of communicating digital data with a plurality of compatible neighbouring radio devices; and
a delay coupled between the microphone input and the audio output;
the radio device configured to receive outgoing audio data from a first neighbouring radio device, to mix an input audio signal received at the microphone input with the received outgoing audio data to obtain combined audio data, and to transmit the combined audio data to a second neighbouring radio device;
the radio device further configured to receive incoming audio data from the second neighbouring radio device, the incoming audio data representing a mix of input audio signals received at the microphone input of the radio device and at microphone inputs of at least the first and second neighbouring radio devices;
the radio device configured to provide an output audio signal corresponding to the received incoming audio data, and to re-transmit the received incoming audio data to the first radio device;
the radio device configured to transmit to the second radio device audio data corresponding to only the input audio signal, in the absence of a first neighbouring radio device,
the radio device configured to re-transmit the combined audio data to the first radio device, in the absence of a second neighbouring radio device, and
wherein the delay is configured to cancel the input audio signal from the microphone input of the radio device in the output audio signal outputted at the audio output.

15. A radio communication system comprising a plurality of radio devices as claimed in claim 14.

16. The radio communication system as claimed in claim 15, wherein the radio devices form a communication chain and each radio device is in communication with a maximum of one first radio device and one second radio device.

17. The radio device as claimed in claim 14, wherein the radio device is a Bluetooth radio device.

18. The radio device as claimed in claim 16, wherein the delay is a variable inverting delay operable for setting a delay period corresponding to a delayed audio signal from the microphone input in the output audio signal destined for the audio output, whereby the delay provides echo cancellation at the audio output.

19. The system as claimed in claim 16, wherein:
the system is configured such that the plurality of radio devices form a communication loop on which a user of one of the radio devices can speak via the microphone input and hear users of the other radio devices via the audio output, and which includes:
a start radio device which has no first neighbouring radio device, the start radio device forms a beginning of the communication chain and starts the communication loop, the start radio device configured to transmit to its second neighbouring radio device audio data corresponding to only the input audio signal;

an end radio device which has no second neighbouring radio device, the end radio device forms an end of the communication chain and closes the communication loop, the end radio device configured to re-transmit the combined audio data to its first neighbouring radio device; and at least one intermediate radio device within the communication chain between the start radio device and the end radio device;

the construction of the radio devices is identical such that any radio device can operate as the start radio device, end radio device, or intermediate radio device, thereby allowing the system to be configured selectively and/or configured dynamically to accommodate relocation of the individual radio devices.

20. An audio communications network comprising a plurality of compatible neighbouring radio devices forming a communication chain, each radio device including a microphone input, an audio output, and a short range radio transceiver, whereby each radio device is operable for contributing audio to the network via its microphone input and for hearing contributions of all other participants via the audio output, thereby providing a communication loop on which a user of each radio device can speak via the microphone input and hear users of the other radio devices via the audio output, wherein the plurality of radio devices include:

a start radio device having a second neighbouring radio device but no first neighbouring radio device, the start radio device forms the beginning of the communication chain and starts the communication loop, the start radio device configured to transmit to its second neighbouring radio device audio data from only the microphone input of the start radio device;

an end radio device having a first neighbouring radio device but no second neighbouring radio device, the end radio device forms an end of the communication chain and closes the communication loop, the end radio device configured to re-transmit combined audio data input from all radio devices in the chain to its first neighbouring radio device; and at least one intermediate radio device having first and second neighbouring radio devices in the communication chain, the intermediate radio device configured to transmit to its second neighbouring radio device a combination of audio data from the microphone inputs of the intermediate radio device and of each first neighbouring device preceding the intermediate radio device in the chain, the intermediate radio device further configured to re-transmit the combined audio data input from all radio devices in the chain to its first neighbouring radio device;

the construction of the radio devices is substantially identical such that any radio device is operable as the start radio device, end radio device, or intermediate radio device.

* * * * *

UNITED STATES PATENT AND TRADEMARK OFFICE
CERTIFICATE OF CORRECTION

PATENT NO. : 8,121,548 B2  Page 1 of 1
APPLICATION NO. : 12/282929
DATED : February 21, 2012
INVENTOR(S) : Nicholas Hunn, Timothy John Wheatley and Mahendra Tailor It is certified that error appears in the above-identified patent and that said Letters Patent is hereby corrected as shown below:

CLAIM 18

Column 8, line 54: delete "claim 16," after "The radio device as claimed in"

Column 8, line 54: insert --claim 14,-- after "The radio device as claimed in"

Signed and Sealed this
Seventeenth Day of April, 2012

David J. Kappos
*Director of the United States Patent and Trademark Office*